(12) United States Patent
Park et al.

(10) Patent No.: US 10,585,508 B2
(45) Date of Patent: Mar. 10, 2020

(54) DRIVING CIRCUIT, TOUCH DISPLAY DEVICE, AND METHOD OF DRIVING SAME

(71) Applicant: LG DISPLAY CO., LTD., Seoul (KR)

(72) Inventors: Yong Chan Park, Paju-si (KR); Ju Han Kim, Paju-si (KR); Sung Chul Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 56 days.

(21) Appl. No.: 15/706,595

(22) Filed: Sep. 15, 2017

(65) Prior Publication Data

US 2018/0081475 A1    Mar. 22, 2018

(30) Foreign Application Priority Data

Sep. 19, 2016    (KR) .......................... 10-2016-0119437

(51) Int. Cl.
*G06F 3/041* (2006.01)
*G06F 3/044* (2006.01)

(52) U.S. Cl.
CPC ............ *G06F 3/0412* (2013.01); *G06F 3/044* (2013.01); *G06F 3/0414* (2013.01); *G06F 3/0416* (2013.01); *G06F 2203/04112* (2013.01)

(58) Field of Classification Search
CPC .... G06F 3/0412; G06F 3/0414; G06F 3/0416; G06F 3/044; G06F 2203/04112; G06F 3/0488; G06F 2203/04107; G06F 2203/04105
See application file for complete search history.

(56) References Cited

U.S. PATENT DOCUMENTS

2017/0177114 A1*  6/2017  Frey .......................... G01L 1/146
2018/0260051 A1*  9/2018  Kim ......................... G06F 3/041

* cited by examiner

*Primary Examiner* — Christopher E Leiby
(74) *Attorney, Agent, or Firm* — Seed IP Law Group LLP

(57) ABSTRACT

Disclosed are a driving circuit, a touch display device, and a method of driving the same. The touch display device for sensing a user's touch force may sense a capacitance change due to a change in a contact area on a display panel after a section in which a sensing value of a touch force based on a change in capacitance between first electrodes and a second electrode becomes a saturated state, thereby sensing the user's touch force even in a section where the change in the capacitance between the first electrodes and the second electrode is small. Accordingly, it is possible to expand a range in which a user's touch force can be sensed and acquire data on a user's touch force linearly indicated in the expanded range, so that touch force leveling becomes easy and various inputs based on the touch force can be processed.

17 Claims, 13 Drawing Sheets

FIG. 11

| force change section | Linear | Saturation |
|---|---|---|
| force sensing method and structure | cross section | |
| | plane | |
| Data processing method | 1 | Force | area |
| | 2 | Force+area | area |
| | 3 | Force | Force+area |
| | 4 | Force+area | Force+area |

DRIVING CIRCUIT, TOUCH DISPLAY DEVICE, AND METHOD OF DRIVING SAME

CROSS REFERENCE TO RELATED APPLICATION

This application claims priority from Korean Patent Application No. 10-2016-0119437, filed Sep. 19, 2016, which is hereby incorporated by reference for all purposes as if fully set forth herein.

BACKGROUND

Technical Field

The present disclosure relates to a touch display device, a method of driving the same, and a driving circuit included in the touch display device.

Description of the Related Art

With the development of the information-oriented society, the demand for display devices for displaying images has increased in various forms, and various types of display devices, such as liquid crystal display devices, plasma display devices, and organic light-emitting display devices have been used.

Among the display devices, mobile devices such as smart phones and tablets, and medium and large-sized devices such as smart televisions provide touch-type input processing, depending on the user convenience and the device characteristics.

The display device capable of performing the touch-type input processing has been developed to provide a greater number and variety of functions, and user's demands have also diversified.

Based on various demands for touch-type input processing, a method of sensing not only a user's touch location (coordinates) on a display panel but also a touch force, corresponding to the magnitude of force with which the display panel is pressed, is applied.

The method of sensing the touch force may be performed by sensing a capacitance change due to a change in a gap within the display panel. The conventional touch force sensing method is inadequate to categorize the magnitude of the touch force and perform input processing according to the categorized touch force.

SUMMARY

An aspect of the present disclosure is to provide a display device and a method of driving the same which expand a sensing range of a touch force detected by a vertical load on a display panel.

An aspect of the present disclosure is to provide a display device and a method of driving the same which sense the touch force according to the force with which a user presses the display panel even after a sensing value of the touch force on the display panel becomes a saturated state.

An aspect of the present disclosure is to provide a display device and a method of driving the same which categorize a magnitude of the touch force on the display panel and process user input according to the categorized touch force.

In accordance with an aspect of the present disclosure, a touch display device is provided. The touch display device includes: a plurality of first electrodes included in a display panel; a second electrode spaced apart from the display panel; and a driving circuit configured to apply a first electrode driving signal to the plurality of first electrodes, apply a second electrode driving signal to the second electrode, and sense at least one of a first capacitance between an object that comes into contact with the display panel and the first electrodes and second a capacitance between the first electrodes and the second electrode.

The driving circuit of the touch display device compares the second capacitance with a reference value, and when the second capacitance is larger than or equal to the reference value, senses a change in the first capacitance according to a contact area of a contact object, which comes into contact with the display panel. Further, the driving circuit senses a touch force on the display panel based on the change in the first capacitance.

That is, the driving circuit senses a user's touch force based on a change in the second capacitance when the second capacitance is smaller than the reference value, and senses the user's touch force based on the change in the first capacitance when the second capacitance is larger than or equal to the reference value.

Alternatively, the driving circuit senses the user's touch force based on the change in the first capacitance and the change in the second capacitance when the second capacitance is smaller than the reference value.

Alternatively, the driving circuit senses the user's touch force based on the change in the first capacitance and the change in the second capacitance when the second capacitance is larger than the reference value.

At this time, the change in the first capacitance used for sensing the user's touch force refers to the degree of change in the first capacitance based on the first capacitance when the second capacitance is the reference value.

The reference value may be set as a value equal to or smaller than the second capacitance at a time point at which a rate of change in the second capacitance becomes a preset value.

Alternatively, the reference value may be set in proportion to the thickness of a cover glass located on the display panel.

When the second capacitance is larger than or equal to the reference value, the driving circuit senses the change in the first capacitance, sets a slope at which the first capacitance changes with the touch force to be the same as a slope at which the second capacitance changes with the touch force in a section where the second capacitance is smaller than the reference value, and senses the user's touch force.

In accordance with another aspect of the present disclosure, a method of driving a touch display device comprising a plurality of first electrodes included in the display panel and a second electrode spaced apart from the display panel is provided. The method includes: applying a first electrode driving signal to the plurality of first electrodes; applying a second electrode driving signal to the second electrode; sensing a second capacitance between the first electrodes and the second electrode; comparing the second capacitance with a reference value; and, when the second capacitance is larger than or equal to the reference value, sensing a touch force by sensing a change in a first capacitance between a contact object and the first electrodes according to a contact area of the contact object that comes into contact with the display panel.

In accordance with another aspect of the present disclosure, a driving circuit is provided. The driving circuit includes: an electrode signal application unit configured to apply a first electrode driving signal to a plurality of first electrodes arranged on a display panel and apply a second electrode driving signal to a second electrode spaced apart from the display panel; a capacitance sensing unit configured to sense at least one of a first capacitance between a contact object, which comes into contact with the display panel, and the first electrodes and a second capacitance between the first electrodes and the second electrode; and a touch force sensing unit configured to compare the second capacitance with a reference value, and when the second capacitance is larger than or equal to the reference value, sense a touch force on the display panel based on a change in the first capacitance.

According to embodiments of the present disclosure, when a vertical load is generated on a display panel, by sensing a user's touch force through the sensing not only of a capacitance change due to a change in a gap within the display panel but also of a capacitance change due to a change in a contact area of the display panel, it is possible to expand a touch force sensing range.

According to embodiments of the present disclosure, by sensing the change in the capacitance due to a change in the contact area of the display panel after the change in the capacitance due to the change in the gap within the display panel becomes a saturated state, it is possible to sense the user's touch force even after the change in the capacitance becomes the saturated state.

According to embodiments of the present disclosure, by expanding a sensing range of the user's touch force through the sensing both of the capacitance change due to the change in the gap and of the capacitance change due to the change in the contact area, it is possible to process various user inputs through leveling of the touch force.

BRIEF DESCRIPTION OF THE DRAWINGS

The above and other objects, features and advantages of the present disclosure will be more apparent from the following detailed description taken in conjunction with the accompanying drawings, in which:

FIG. 11 illustrates an example of a method by which the touch display device senses the touch force according to the present embodiments.

DETAILED DESCRIPTION

Figure 1:
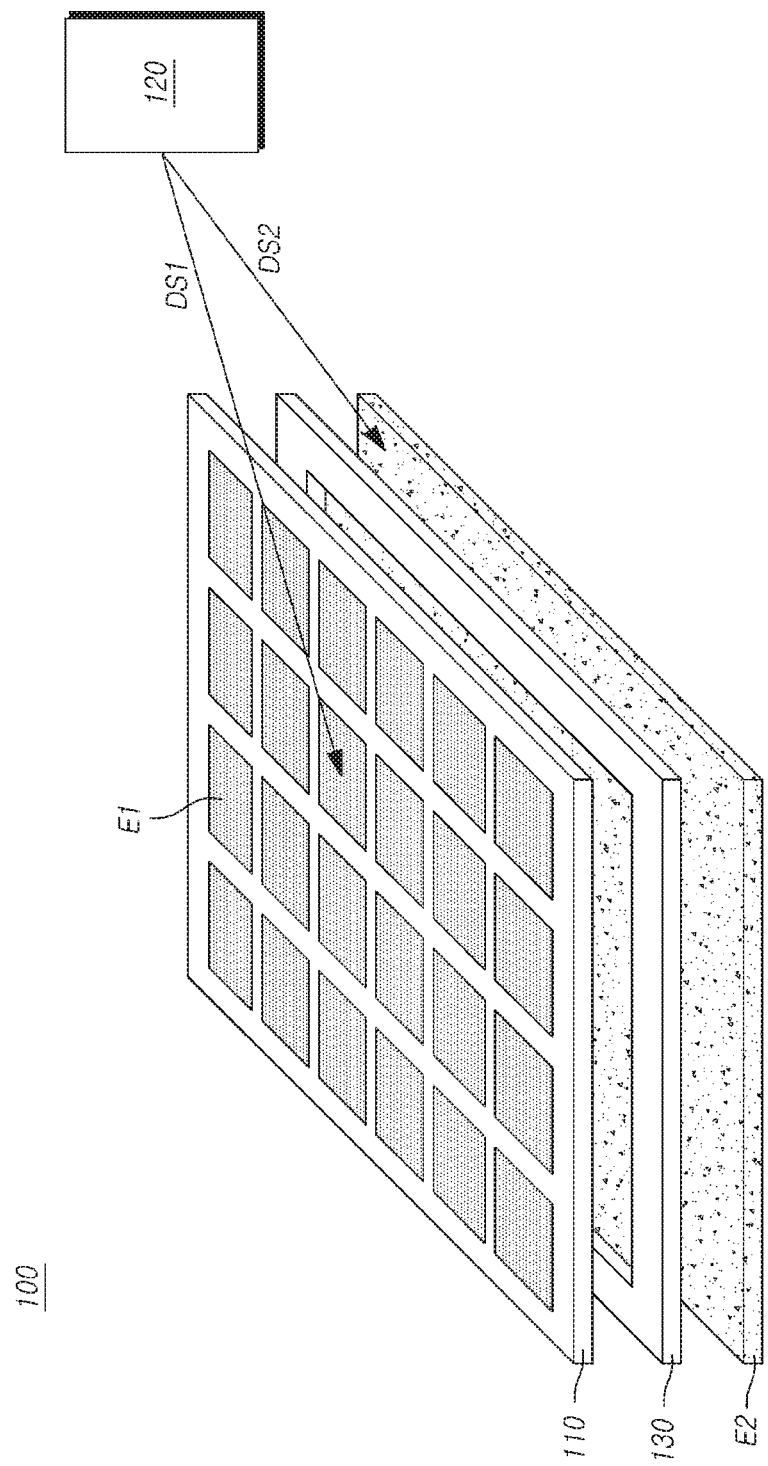
FIGS. 1 and 2 schematically illustrate the configuration of a touch display device according to the present embodiments.

Hereinafter, some embodiments of the present disclosure will be described in detail with reference to the accompanying illustrative drawings. In designating elements of the drawings by reference numerals, the same elements will be designated by the same reference numerals although they are shown in different drawings. Further, in the following description of the present disclosure, a detailed description of known functions, structure and configurations may be omitted.

In addition, terms, such as first, second, A, B, (a), (b) or the like may be used herein when describing components of the present disclosure. These terms are merely used to distinguish one component from other components, and the property, order, sequence and the like of the corresponding component are not limited by the corresponding term. In the case that it is described that a certain structural element "is connected to", "is coupled to", or "is in contact with" another structural element, it should be interpreted that another structural element may "be connected to", "be coupled to", or "be in contact with" the structural elements and unless a term such as "directly" is also used, it is not required that the certain structural element is directly connected to or is in direct contact with another structural element.

Figure 2:
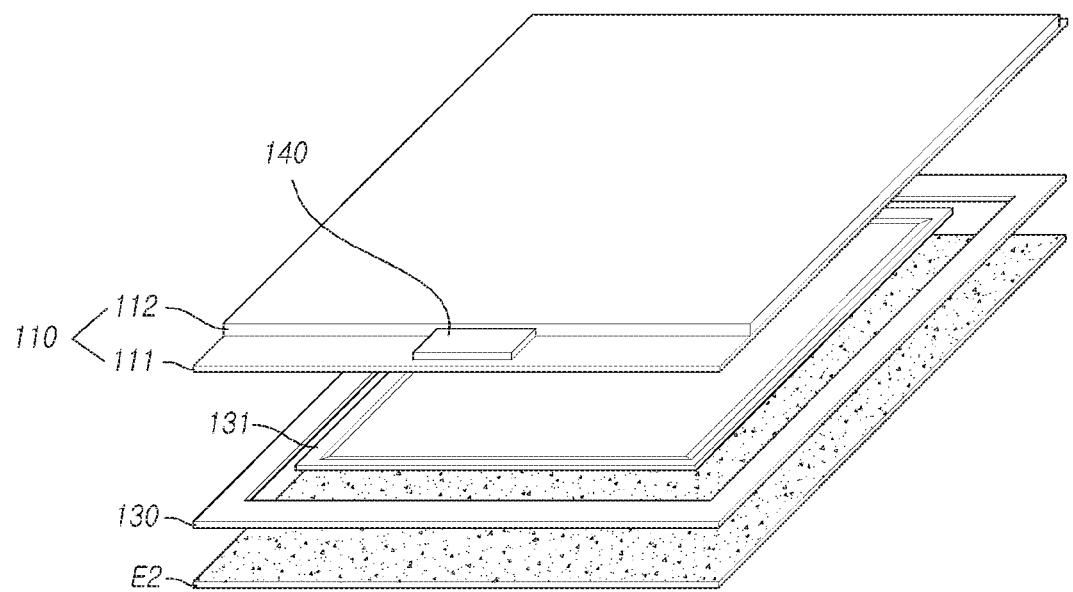

FIGS. 1 and 2 schematically illustrate the configuration of a touch display device 100 according to the present embodiments.

Referring to FIG. 1, the touch display device 100 according to the present embodiments may include a plurality of first electrodes (E1) for sensing the presence or absence of a user's touch and a touch location (touch coordinates), a second electrode (E2) for sensing a user's touch force, a display panel 110 including the plurality of first electrodes (E1), a driving circuit 120 for driving the plurality of first electrodes (E1) and the second electrode (E2), and a gap structure unit 130 for maintaining a gap between the plurality of first electrodes (E1) and the second electrode (E2).

The touch display device 100 according to the present embodiments may operate in a display mode for displaying an image, or may operate in a touch mode for sensing a user's touch (presence or absence of a touch, a touch location, or a touch force).

When the touch display device 100 operates in the display mode, the touch display device 100 displays an image by driving data lines and gate lines arranged on the display panel 110.

At this time, a display driving voltage for displaying the image is applied to the plurality of first electrodes (E1) included in the display panel 110. That is, the plurality of first electrodes (E1) operate as electrodes for display driving in a display mode section.

When the touch display device 100 operates in the touch mode, the touch display device 100 may sense a user's touch location (touch coordinates) or a user's touch force.

When the user's touch location (touch coordinates) is sensed (touch driving section), the driving circuit 120 senses the user's touch location (touch coordinates) by sequentially applying a first electrode driving signal (DS1) to the plurality of first electrodes (E1).

When the user's touch force is sensed (force driving section), the driving circuit 120 senses the user's touch force by applying the first electrode driving signal (DS1) to the plurality of first electrodes (E1) and a second electrode driving signal to the second electrode (E2).

When a vertical load is generated on the display panel 110 by the user, the touch display device 100 according to the present embodiments senses the user's touch force based on a change in a gap distance between the plurality of first electrodes (E1) and the second electrode (E2).

Accordingly, the plurality of first electrodes (E1) included in the display panel 110 and the second electrode (E2) located outside the display panel 110 must have a gap therebetween, and the gap structure unit 130 may be disposed between the plurality of first electrodes (E1) and the second electrode (E2) in order to maintain the gap.

That is, when a user's touch is generated, the size of the gap between the plurality of first electrodes (E1) and the second electrode (E2) can be changed through the gap structure unit 130, and not only the user's touch location (touch coordinates) but also the touch force can be sensed through the change in the gap size.

Hereinafter, the structure of the touch display device 100 according to the present embodiments will be described in greater detail with reference to FIG. 2.

Referring to FIG. 2, the display panel 110 of the touch display device 100 according to the present embodiments may include a first substrate 111, on which a Thin Film Transistor (TFT) is arranged, and a second substrate 112, on which a Color Filter (CF) is arranged.

Further, the driving chip 140 may be mounted on, bonded to, or connected to an edge portion (non-active region) of the first substrate 111.

The driving chip 140 may be a chip generated by implementing the entirety or part of the driving circuit 120, a data driving chip, or a display driving chip including the entirety or part of the driving circuit 120 and the data driving chip.

A lower structure 131 may be located below the display panel 110, and the second electrode (E2) may be located below or inside the lower structure 131.

The lower structure 131 may be, for example, a backlight unit of the liquid crystal display device.

In this case, the second electrode (E2) may be located below the backlight unit. Accordingly, the second electrode (E2) may be disposed without disturbing the light radiation function of the backlight unit.

The gap structure unit 130 may be located below, inside, or beside the lower structure 131. Further, the second electrode (E2) may be located below or inside the gap structure unit 130.

As described above, by variously designing the location of the second electrode (E2) or the location of the gap structure unit 130, a touch force sensing structure suitable for the designed structure of the display panel 110 and the touch display device 100 may be implemented.

Hereinafter, the method by which the touch display device 100 according to the present embodiments senses a user's touch location (touch coordinates) and the touch force will be described with reference to FIGS. 3 and 4, and the case where the touch display device 100 according to the present embodiments is a liquid crystal display device will be described as an example for convenience of the description.

Figure 3:
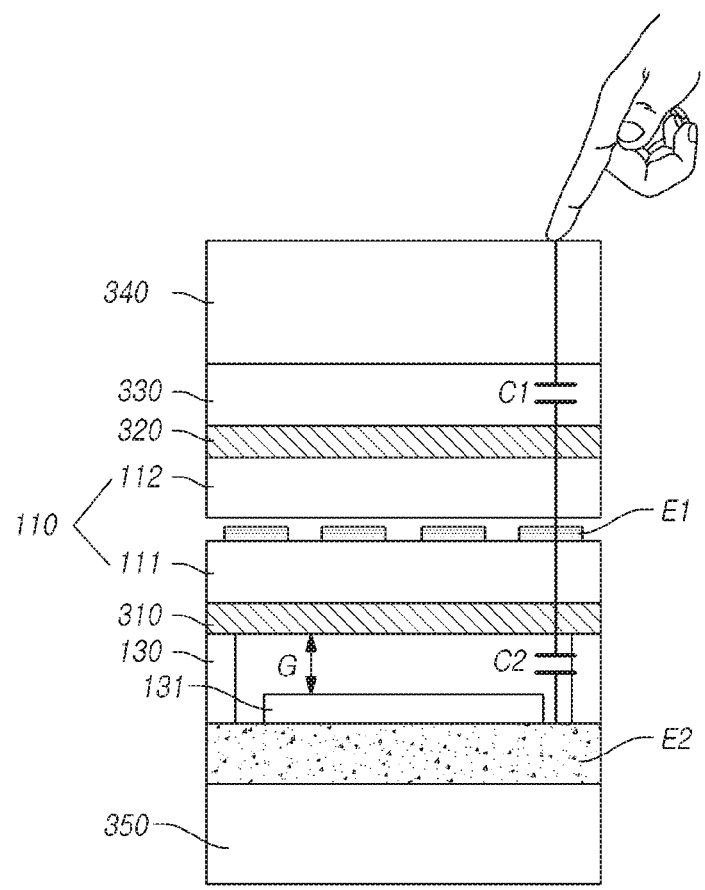
FIG. 3 illustrates an example of a cross section of the touch display device according to the present embodiments.
Figure 4:
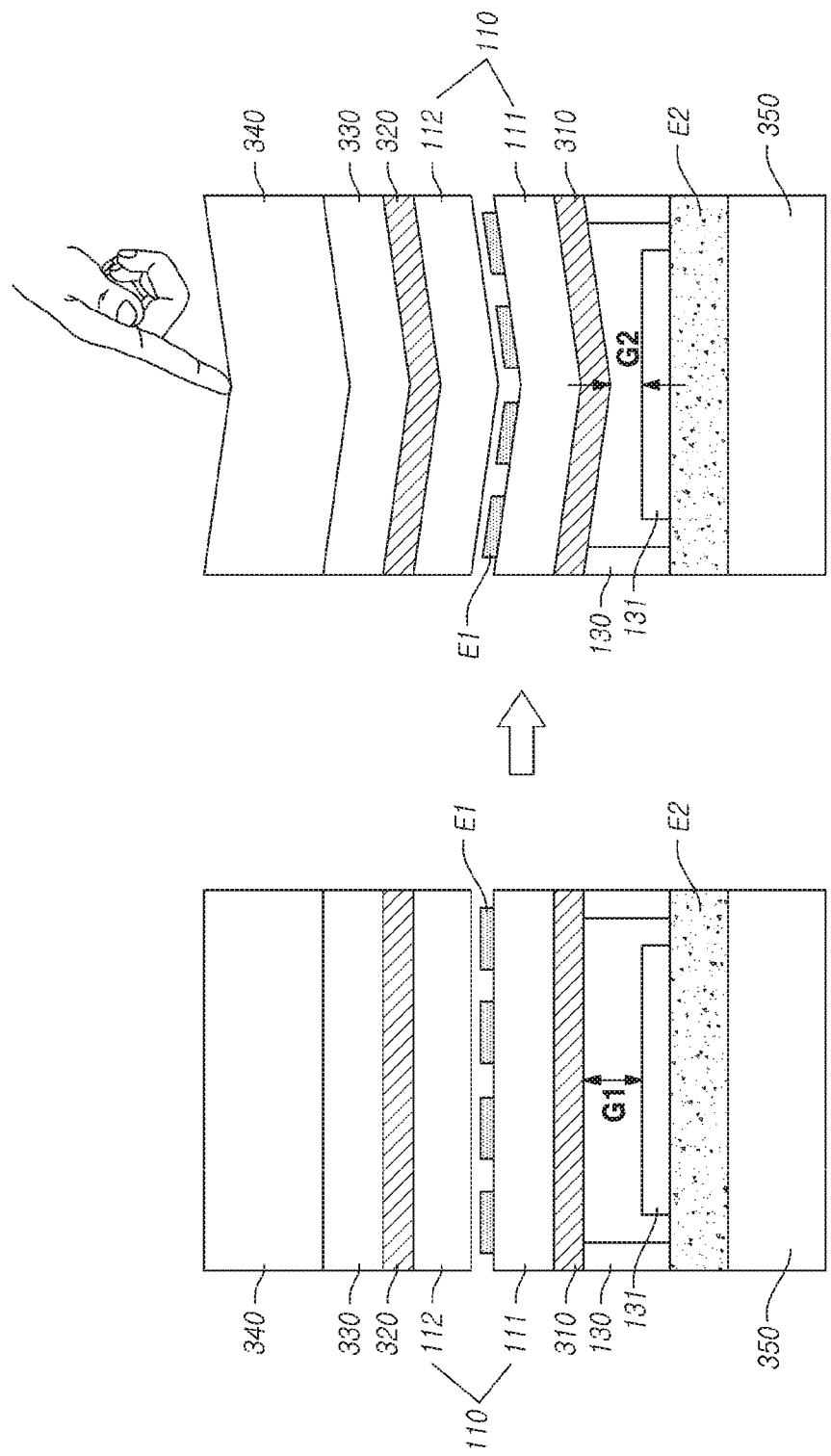
FIG. 4 illustrates a method by which the touch display device senses a user's touch force according to the present embodiments.

FIG. 3 illustrates a cross section of the touch display device 100 according to the present embodiments, and FIG. 4 illustrates the situation where the gap between the plurality of first electrodes (E1) and the second electrode (E2) is changed by a user's touch on the touch display device 100.

Referring to FIG. 3, the display panel 110 of the touch display device 100 includes a first polarizing plate 310, the first substrate 111, the plurality of first electrodes (E1), the second substrate 112, and a second polarizing plate 320.

Further, a bonding layer 330 and a cover glass 340 are located on the display panel 110. In addition, a cover bottom 350 is located below the second electrode (E2).

The touch display device 100 applies the first electrode driving signal (DS1) to the plurality of first electrodes (E1) in a touch driving section for sensing the user's touch location (touch coordinates) during operation in the touch mode.

When a user's touch is generated, the touch display device 100 senses the user's touch location (touch coordinates) by sensing a change in the size of a first capacitance (C1) between a pointer, which is a conductor such as a user's finger, and the plurality of first electrodes (E1).

The touch display device 100 applies the first electrode driving signal (DS1) to the plurality of first electrodes (E1) in a force driving section for sensing the user's touch force and applies the second electrode driving signal (DS2) to the second electrode (E2) during operation in the touch mode.

At this time, the second electrode driving signal (DS2) applied to the second electrode (E2) may be a signal of a ground voltage.

When a vertical load is generated by a user's touch, the touch display device 100 senses the user's touch force by sensing a change in a second capacitance (C2) due to the change in the gap (G) between the plurality of first electrodes (E1) and the second electrode (E2).

That is, when the user's touch occurs, the touch display device 100 senses the touch location (touch coordinates) by sensing the change in the first capacitance (C1) and senses the touch force by sensing the change in the second capacitance (C2). For the sensing of the change in the second capacitance (C2), a gap (G) exists between the plurality of first electrodes (E1) and the second electrode (E2).

Referring to FIG. 4, when the vertical load is generated by a user's touch, the cover glass 340 and the display panel 110 are slightly bent downwards.

Accordingly, the size of the gap (G), such as an air gap or a dielectric gap, existing between the plurality of first electrodes (E1) and the second electrode (E2) may be changed.

As illustrated in the example of FIG. 4, when the gap (G) before the vertical load is generated by a user's touch is G1 and the gap (G) after the vertical load is generated by the user's touch is G2, G2 becomes smaller than G1 due to the vertical load.

As described above, as the gap (G) between the plurality of first electrodes (E1) and the second electrode (E2) decreases from G1 to G2 due to the generation of the vertical load by the user's touch, the second capacitance (C2) may be changed and thus the user's touch force may be sensed.

If the change in the second capacitance (C2) due to the change in the gap (G) between the first electrodes (E1) and the second electrode (E2) increases by a predetermined level or more, the change in the second capacitance becomes saturated, and thus converges on a predetermined value.

Figure 5:
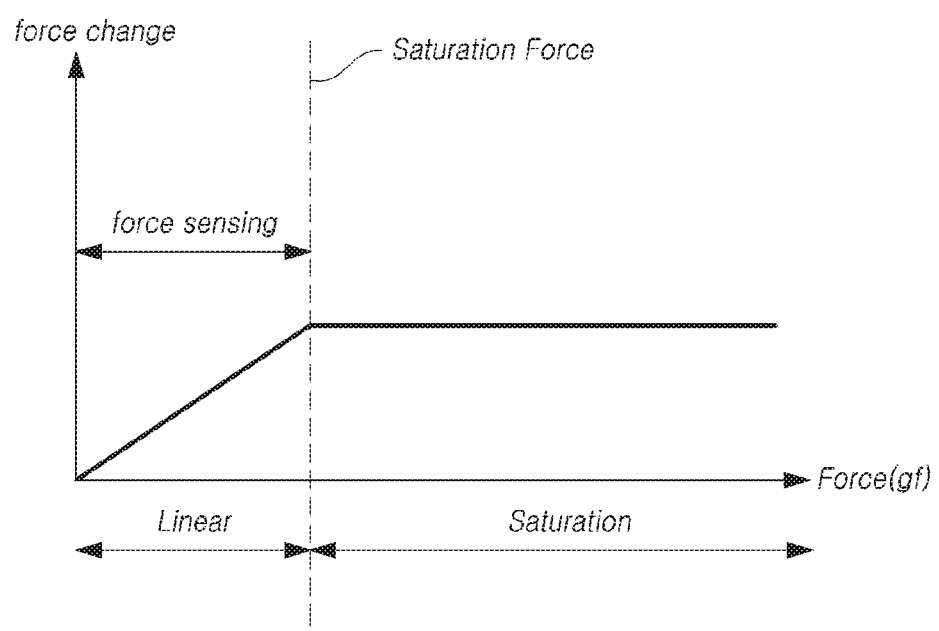
FIG. 5 illustrates an example of a change in a sensing value of the touch force in the touch display device according to the present embodiments.

FIG. 5 illustrates a change in a touch force sensing value according to the magnitude of the vertical load when the vertical load (i.e. a vertical component of the user's touch force) is generated on the display panel 110 of the touch display device 100 according to the present embodiments.

Referring to FIG. 5, when the vertical load is generated on the display panel 110, the size of the gap (G) between the first electrodes (E1) and the second electrode (E2) is changed by the vertical load.

The second capacitance (C2) may be changed according to the change in the size of the gap (G) between the first electrodes (E1) and the second electrode (E2), and through the sensing of the change in the second capacitance, the touch force due to the vertical load may be sensed.

The change in the second capacitance (C2) attributable to the change in the size of the gap (G) is linear before the second capacitance (C2) reaches a predetermined level, and when the second capacitance (C2) increases to reach or exceed the predetermined level, that is, when the second capacitance (C2) becomes a value higher than or equal to a capacitance value corresponding to a saturation force of FIG. 5, the second capacitance (C2) becomes saturated and thus does not increase any further.

Particularly, as the thickness of the cover glass 340 located on the display panel 110 decreases, a section, in which the change in the second capacitance (C2) reaches the saturated state, becomes shorter.

Accordingly, although a signal for sensing the user's touch force is separately received, it is difficult to perform input processing by measuring the user's touch force since the section, in which the change in the second capacitance (C2) reaches the saturated state, is short.

The present embodiments provide the touch display device 100 that can expand the range in which the user's touch force can be sensed and perform input processing by the touch force measuring through the expanded sensing range of the touch force.

Figure 6:
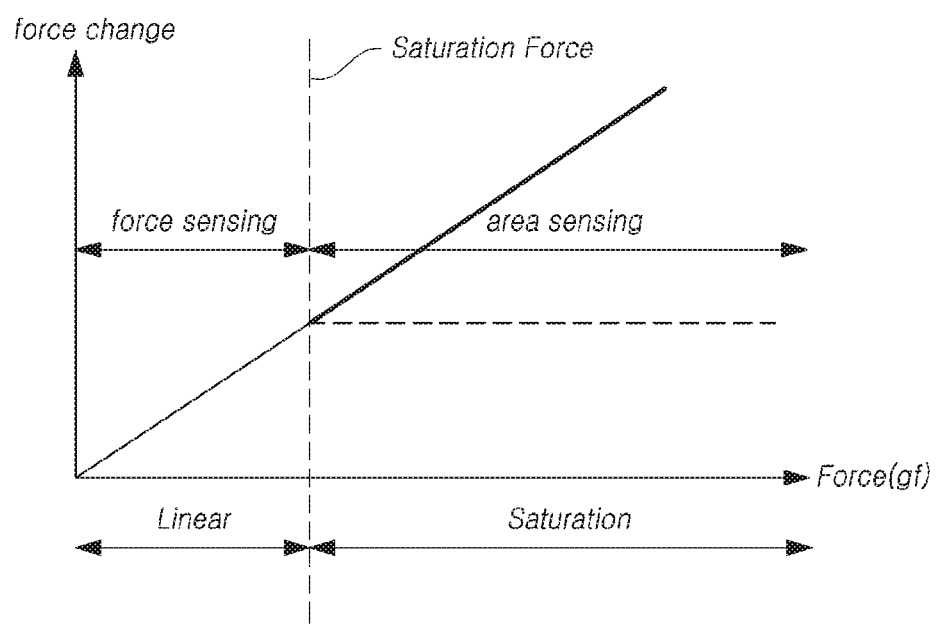
FIGS. 6 and 7 illustrate examples of sections in which the touch display device performs gap change sensing and area sensing according to the present embodiments.

FIG. 6 illustrates a method by which the touch display device 100 senses a user's touch force according to the present embodiments based on the change in the second capacitance (C2).

Referring to FIG. 6, when the vertical load is generated on the display panel 110, the touch display device 100 according to the present embodiments senses the change in the second capacitance (C2) due to the change in the gap (G) between the first electrodes (E1) and the second electrode (E2).

The second capacitance (C2) linearly increases according to the user's touch force, and the touch display device 100 senses the user's touch force based on the change in the second capacitance (C2) in a section before the second capacitance (C2) reaches the saturated state.

In FIG. 6, before the second capacitance (C2) changes to reach the saturated state corresponding to the saturation force, the touch display device 100 senses the user's touch force by sensing the change in the second capacitance (C2).

In a section after the second capacitance (C2) changes to reach the saturated state corresponding to the saturation force, the touch display device 100 senses the user's touch force by sensing a change in the first capacitance due to a change in the contact area of an object that comes into contact with the display panel 110.

This is because the user's touch force can be sensed through the sensing of the change in the first capacitance (C1) due to the change in the contact area based on the first capacitance (C1) according to the contact area on the display panel 110 at the time point at which the second capacitance (C2) reaches the saturated state.

That is, a value of the second capacitance that makes the second capacitance, generated by the vertical load on the display panel 110, become the saturated state is set as a reference value, and the touch display panel 110 performs the force sensing based on the change in the second capacitance (C2) when the second capacitance (C2) is smaller than the reference value and performs the area sensing based on the change in the first capacitance (C1) when the second capacitance (C2) is larger than or equal to the reference value.

In the section where the change in the second capacitance (C2) reaches the saturated state and thus the user's touch force cannot be sensed through the change in the second capacitance (C2), by performing the area sensing using the change in the first capacitance (C1), the range of sensing the user's touch force can be expanded.

A reference value for dividing the force sensing section and the area sensing section may be set as a value of the second capacitance (C2) that makes the change in the second capacitance (C2) reach the saturated state.

For example, when the vertical load is generated on the display panel 110, the second capacitance (C2) at the time point at which a change rate of the second capacitance (C2) becomes equal to or smaller than a preset value may be set as the reference value.

Accordingly, in the section where the user's touch force cannot be sensed using the change in the second capacitance (C2), the user's touch force can be sensed through the area sensing using the change in the first capacitance (C1).

The reference value may be set to be smaller than the value of the second capacitance (C2) that makes the second capacitance (C2) reach the saturated state, or may be set based on the thickness of the cover glass 340 located on the display panel 110.

Figure 7:
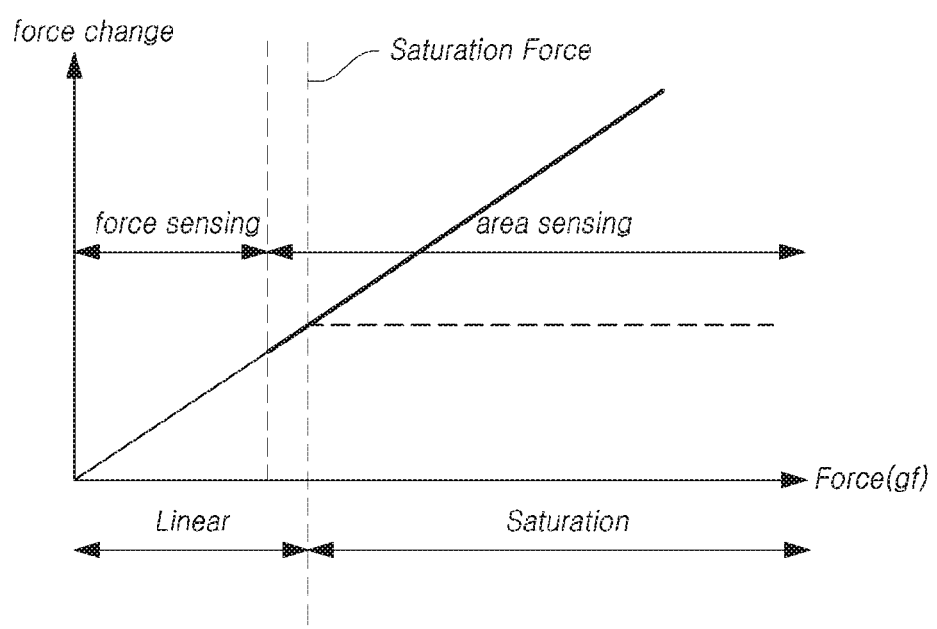

FIG. 7 illustrates another example in which the touch display device 100 according to the present embodiments sets the reference value for dividing the force sensing and the area sensing.

Referring to FIG. 7, the reference value for dividing the force sensing and the area sensing is set as a value smaller than the value of the second capacitance (C2) at the moment at which the second capacitance (C2), which changes when the vertical load is generated on the display panel 110, reaches the saturated state.

By setting the reference value to be smaller than the value of the second capacitance (C2) at the moment at which the second capacitance (C2) reaches the saturated state, the accuracy of the touch force sensing can be increased in the force sensing section, in which the user's touch force is sensed using the change in the second capacitance (C2).

Further, in the section in which the second capacitance (C2) is larger than or equal to the reference value, the user's touch force can be sensed through the area sensing using the change in the first capacitance (C1).

At this time, in the section in which the second capacitance (C2) is larger than or equal to the reference value, the user's touch force can be sensed by sensing both the first capacitance (C1) and the second capacitance (C2).

That is, the accuracy of the sensing of the user's touch force can be improved in the force sensing section through the reference value, which is set to be smaller, and the change in the second capacitance (C2) can also be used for the sensing of user's touch force through both the sensing of the first capacitance (C1) and the sensing of the second capacitance (C2) in the area sensing section.

Meanwhile, the reference value for dividing the force sensing section and the area sensing section may be set based on the thickness of the cover glass 340 located on the display panel 110.

Figure 8:
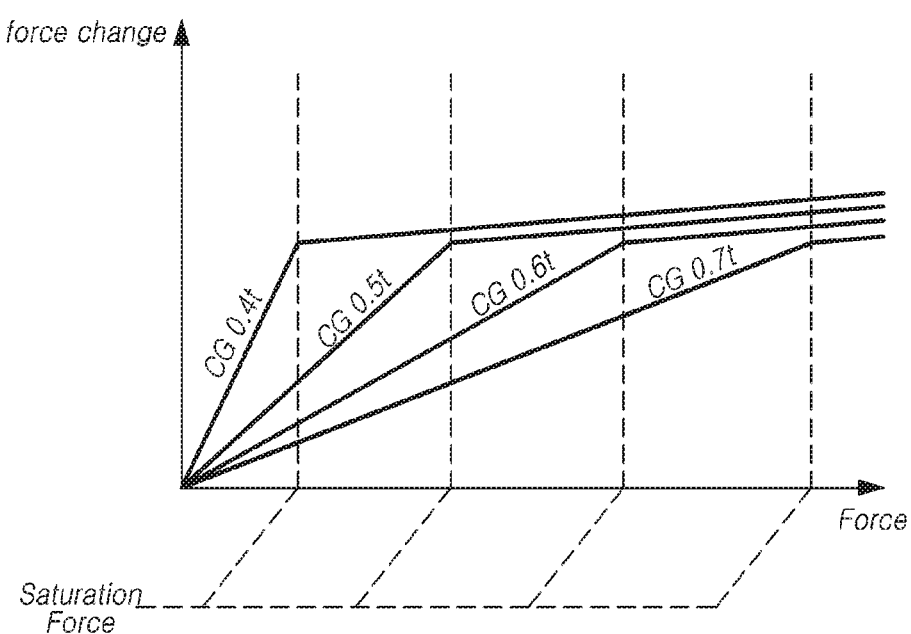
FIG. 8 illustrates an example of the change in the sensing value of the touch force based on the thickness of a cover glass in the touch display device according to the present embodiments.

FIG. 8 illustrates the section where the second capacitance (C2) changes to reach the saturated state based on the thickness of the cover glass 340 in the touch display device 100 according to the present embodiments.

Referring to FIG. 8, it is noted that, as the thickness of the cover glass 340 located on the display panel 110 decreases, the section where the second capacitance (C2) changes to reach the saturated state becomes shorter.

For example, when the thickness of the cover glass 340 is 0.4 t, the section where the second capacitance (C2) changes to reach the saturated state is the shortest, and in the corresponding section, the slope at which the second capacitance (C2) changes with the touch force is steep.

In contrast, when the thickness of the cover glass 340 is 0.7 t, the section where the second capacitance (C2) changes to reach the saturated state is the longest, and in the corresponding section, a slope at which the second capacitance (C2) changes with the touch force is gentle.

Accordingly, the reference value for dividing the force sensing section and the area sensing section is set to be smaller as the thickness of the cover glass 340 located on the display panel 110 decreases, and is set to be larger as the thickness of the cover glass 340 increases.

By differently setting the reference value depending on the thickness of the cover glass 340, the force sensing section where the touch force can be sensed using the change in the second capacitance (C2) can be clearly divided, and in the following section, the user's touch force can be sensed after the second capacitance (C2) reaches the saturated state by performing area sensing in the following sections.

Figure 9:
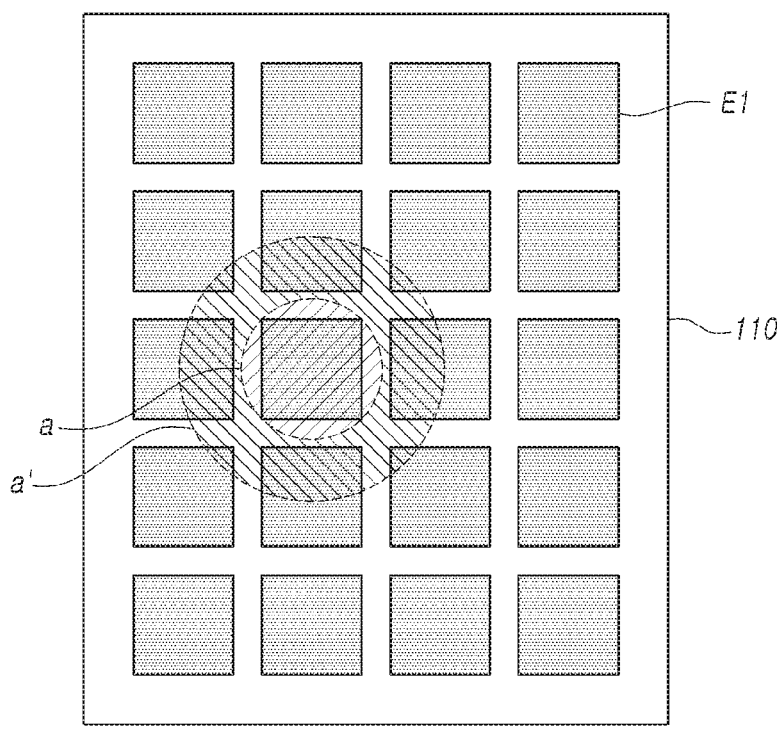
FIG. 9 illustrates a method by which the touch display device performs area sensing according to the present embodiments.

FIG. 9 illustrates a method by which the touch display device 100 according to the present embodiments performs the area sensing in the section where the user's touch force is sensed.

Referring to FIG. 9, the touch display device 100 according to the present embodiments senses the user's touch force based on the change in the second capacitance (C2) in the section where the second capacitance (C2) between the first electrodes (E1) and the second electrode (E2) is linearly increased by the vertical load on the display panel 110.

When the second capacitance (C2) reaches the saturated state, the touch display device 100 senses the first capacitance (C1) according to an area change based on a contact area at the moment when the second capacitance (C2) reaches the saturated state.

For example, when the contact area at the moment when the second capacitance (C2) reaches the saturated state is a, the contact area may increase to be a' if the vertical load is applied even after the second capacitance (C2) reaches the saturated state.

When the contact area changes from a to a', the first capacitance (C1) of the first electrodes (E1) disposed between the region a' and the region a changes.

Based on the first capacitance (C1) of the first electrodes (E1) in the state where the contact area is a, by sensing the change in the first capacitance (C1) of the first electrodes (E1) in the state where the contact area is a', the change in the contact area can be sensed.

The user's touch force can be sensed using the sensing value according to the change in the contact area even after the second capacitance (C2) becomes the saturated state.

At this time, in the section where the second capacitance (C2) linearly increases before the second capacitance (C2) reaches the saturated state, the slope of the change in the first capacitance (C1) according to the change in the contact area may be set to be the same as the slope according to the change in the second capacitance (C2).

That is, by setting the slope at which the first capacitance (C1) changes with the touch force in the area sensing section to be the same as the slope at which the second capacitance (C2) changes with the touch force in the force sensing section, the user's touch force may be linearly sensed in the force sensing section and the area sensing section, and the leveling of the touch force may become easy.

Figure 10A:
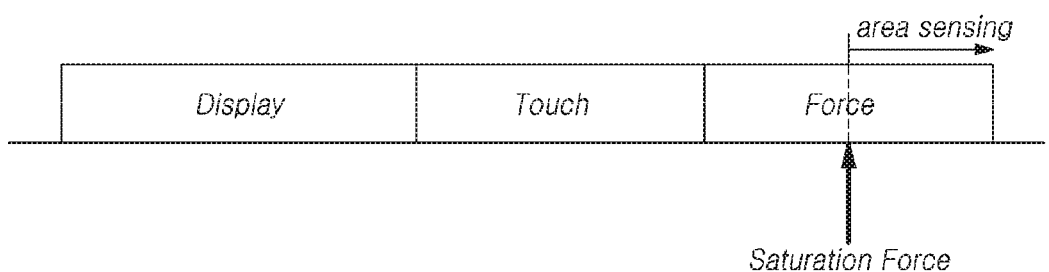
FIGS. 10A and 10B illustrate the timing at which the touch display device performs area sensing according to the present embodiments.
Figure 10B:
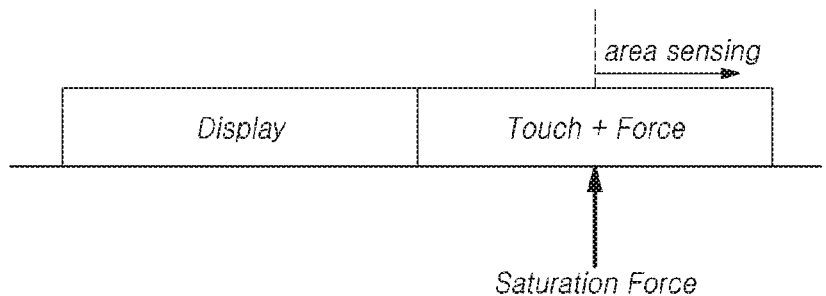

FIGS. 10A and 10B illustrate the timing at which the force sensing and the area sensing are performed in the section where the touch display device 100 according to the present embodiments senses a user's touch force.

Referring to FIG. 10A, the touch display device 100 according to the present embodiments may temporally divide a display driving section, in which the image is displayed, a touch driving section, in which the user's touch location (coordinates) is sensed, and a force driving section, in which the user's touch force is sensed.

The touch display device 100 senses the user's touch force by sensing the change in the second capacitance (C2) between the first electrodes (E1) and the second electrode (E2) in the force driving section.

When the second capacitance (C2) reaches the saturated state in the force driving section, the touch display device 100 performs the area sensing corresponding to the sensing of the change in the first capacitance (C1) based on the first capacitance (C1) at the moment at which the second capacitance (C2) reaches the saturated state.

That is, since the first electrode driving signal (DS1) is applied to the first electrodes (E1) in the force driving section, if the second capacitance (C2) reaches the saturated state, the area sensing can be performed by sensing the change in the first capacitance (C1) from the first electrodes (E1).

Accordingly, by performing only the force sensing or both the force sensing and the area sensing according to the change in the second capacitance (C2) in the force driving section, the touch display device 100 may expand the range in which the user's touch force can be sensed.

Alternatively, even when the sensing of the user's touch location (coordinates) and the sensing of the touch force are performed at the same time, the user's touch force can be sensed using the area sensing.

Referring to FIG. 10B, the sensing of the touch location (coordinates) and the sensing of the touch force can be performed at the same time in a time section separated from the display driving section in which the image is displayed.

In this case, the user's touch location (coordinates) and the touch force are sensed by separating the change in the first capacitance (C1) and the change in the second capacitance (C2), which were sensed at the same time.

At this time, when the second capacitance (C2) reaches the saturated state, the area sensing can be performed using the simultaneously sensed first capacitance (C1).

Further, by sensing the user's touch force through the area sensing, sensing the user's touch force after the saturated state of the second capacitance (C2) can be performed even when the user's touch location (coordinates) and the touch force are simultaneously sensed.

FIG. 11 illustrates various examples of sections and methods of performing the force sensing and the area sensing by the touch display device 100 according to the present embodiments.

Referring to FIG. 11, the touch display device 100 according to the present embodiments senses the user's touch force based on the change in the second capacitance (C2) in the section where the second capacitance (C2) is linearly increased by the vertical load on the display panel 110.

Further, in the section where the second capacitance (C2) reaches the saturated state, the touch display device 100 senses the user's touch force by sensing the change in the first capacitance (C1) due to the change in the contact area on the display panel 110 (data processing method 1).

Alternatively, in the section where the second capacitance (C2) linearly increases, the touch display device 100 senses the user's touch force by sensing both the change in the second capacitance (C2) due to the change in the gap (G) and the change in the first capacitance (C1) due to the area change.

In this case, by compensating for the case where the change in the second capacitance (C2) is non-linear through the area sensing, the touch display device 100 may make leveling easy by linearly sensing the user's touch force in the force sensing section (data processing method 2).

Alternatively, in the section where the second capacitance (C2) reaches the saturated state, the touch display device 100 may simultaneously perform the area sensing using the change in the first capacitance (C1) and the force sensing using the change in the second capacitance (C2).

When reference values of the force sensing section and the area sensing section are set to be smaller than respective values at the moment at which the second capacitance (C2) reaches the saturated state, the touch display device 100 may improve the accuracy of the sensing of the user's touch force in the section where the second capacitance (C2) is larger than or equal to the reference value by performing both the force sensing and the area sensing (data processing method 3).

Alternatively, the touch display device 100 may compensate for the value of the force sensing through the area sensing in the section where the second capacitance (C2) linearly increases and the value of the area sensing through the force sensing in the section where the second capacitance (C2) is in the saturated state (data processing method 4).

Figure 12:
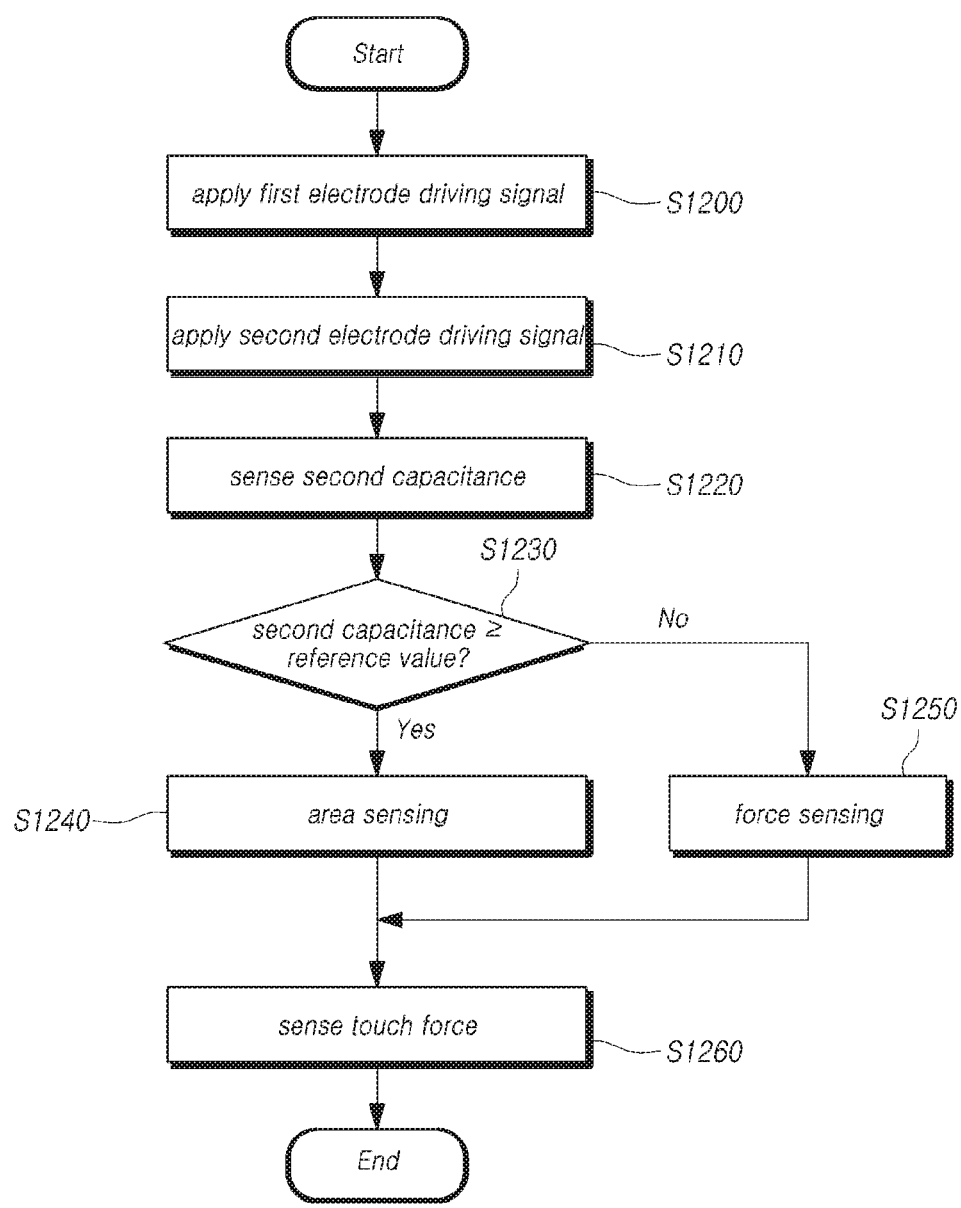
FIG. 12 is a flowchart illustrating a process of a method of driving the touch display device according to the present embodiments.

FIG. 12 illustrates a process of a method of driving the touch display device 100 according to the present embodiments.

Referring to FIG. 12, in the force driving section, the touch display device 100 according to the present embodiments applies the first electrode driving signal (DS1) to the first electrodes (E1) in S1200 and applies the second electrode driving signal (DS2) to the second electrode (E2) in S1210.

When the vertical load is generated on the display panel 110, the touch display device 100 senses the change in the second capacitance (C2) due to the change in the gap (G) between the first electrodes (E1) and the second electrode (E2) in S1220.

The touch display device 100 identifies whether the sensed change in the second capacitance (C2) is larger than or equal to a reference value through comparison with the reference value in S1230.

The reference value may be a value set based on a value of the second capacitance (C2) at the moment when the change in the second capacitance (C2) reaches the saturated state depending upon the thickness of the cover glass 340 located on the display panel 110.

When the second capacitance (C2) is larger than or equal to the reference value, the touch display device 100 performs the area sensing using the change in the first capacitance (C1) due to the change in the contact area on the display panel 110 in S1240.

When the second capacitance (C2) is smaller than the reference value, the touch display device 100 performs force sensing using the change in the second capacitance (C2) in S1250.

The touch display device 100 senses the user's touch force based on data on the force sensing or the area sensing in each section in S1260.

According to the present embodiments, when the vertical load is generated on the display panel 110, the touch display device 100 may sense the user's touch force through the force sensing based on the change in the gap (G) between the first electrodes (E1) and the second electrode (E2) and the area sensing based on the change in the contact area on the display panel 110.

After the change in the second capacitance (C2) between the first electrodes (E1) and the second electrode (E2) reaches the saturated state, the touch display device 100 may expand the range in which the user's touch force can be sensed by performing the area sensing.

Further, by increasing the section within which the data generated by sensing the user's touch force is linear, the touch display device 100 may make user's touch force leveling easy and make various kinds of input processing using the touch force sensing possible.

Although a preferred embodiment of the present disclosure has been described for illustrative purposes, those skilled in the art will appreciate that various modifications, additions and substitutions are possible, without departing from the scope and spirit of the disclosure as disclosed in the accompanying claims. Therefore, exemplary embodiments of the present disclosure have been described for the sake of brevity and clarity. The scope of the present disclosure shall be construed on the basis of the accompanying claims in such a manner that all of the technical ideas included within the scope equivalent to the claims belong to the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A touch display device comprising:
a plurality of first electrodes included in a display panel;
a second electrode spaced apart from the display panel; and
a driving circuit configured to apply a first electrode driving signal to the plurality of first electrodes, apply a second electrode driving signal to the second electrode, and sense at least one of a first capacitance between an object, which comes into contact with the display panel, and the first electrodes and a second capacitance between the first electrodes and the second electrode, and set a reference value to be smaller than a reference saturation value of the second capacitance at the moment at which the second capacitance reaches a saturated state, wherein, in a force sensing section in which the second capacitance is smaller than the reference value, the driving circuit senses a change in the second capacitance, and a touch force applied from the object is sensed at the display panel based on the change in the second capacitance, and in an area sensing section in which the second capacitance is larger than or equal to the reference saturation value, the driving circuit senses a change in the first capacitance according to a contact area of the object that comes into contact with the display panel, and senses the touch force on the display panel based on the change in the first capacitance, in the area sensing section in which the second capacitance is larger than or equal to the reference value and smaller than the reference saturation value, the driving circuit senses a change based on both the first capacitance and the second capacitance according to a contact area of the object that comes into contact with the display panel.

2. The touch display device of claim 1, wherein the driving circuit sets a slope according to the change in the first capacitance to be identical to a slope according to a change in the second capacitance in the force sensing section where the second capacitance is smaller than the reference saturation value, and senses the touch force based on the change of the first capacitance according to the set slope.

3. The touch display device of claim 1, wherein the reference saturation value is set to be equal to or smaller than a value of the second capacitance at a time point at which a change rate of the second capacitance becomes smaller than a preset value.

4. The touch display device of claim 1, wherein, the second electrode driving signal is a ground voltage.

5. The touch display device of claim 1, further comprising:
a backlight unit positioned between the second electrode and the display panel,
wherein the backlight unit is directly on the second electrode.

6. The touch display device of claim 5, further comprising:
a first polarizing plate between the plurality of first electrodes and the second electrode; and
a second polarizing plate on the plurality of first electrodes.

7. The touch display device of claim 6, further comprising:
a gap between the backlight unit and the first polarizing plate, wherein the gap includes either an air gap or a dielectric gap.

8. The touch display device of claim 7, wherein a distance measurement between the backlight unit and the first polarizing plate within the gap changes based on the touch force applied from the object,
wherein a minimum of the distance measurement is indicative of the saturated state.

9. A method of driving a touch display device having a plurality of first electrodes included in a display panel, a second electrode spaced apart from the display panel, the method comprising:
applying a first electrode driving signal to the plurality of first electrodes;
applying a second electrode driving signal to the second electrode;
sensing a second capacitance between the first electrodes and the second electrode;

setting a reference saturation value of the second capacitance at the moment at which the second capacitance reaches a saturated state;
comparing the second capacitance with a reference value and the reference saturation value, wherein the reference value is smaller than the reference saturation value;

in response to
the second capacitance being smaller than the reference value, sensing a touch force applied on the display panel based on a change in the second capacitance;
in response to the second capacitance being larger than or equal to the reference saturation value, sensing the touch force based on a change in a first capacitance between a contact object and the first electrodes, wherein a contact area of the contact object changes based on the contact object coming into contact with the display panel; and
in response to the second capacitance being larger than or equal to the reference value and smaller than the reference saturation value, sensing the touch force based on both a change in the first capacitance and the second capacitance.

10. The method of claim 9, wherein the sensing of the touch force comprises:
identifying the first capacitance when the second capacitance is the reference value; and
sensing a change in the first capacitance based on the identified first capacitance and sensing the touch force based on the sensed change of the first capacitance.

11. The method of claim 9, wherein, the second electrode driving signal is a ground voltage.

12. The method of claim 9, further comprising:
forming a backlight unit between the second electrode and the display panel,
wherein the backlight unit is directly on the second electrode.

13. The method of claim 12, further comprising:
forming a first polarizing plate between the plurality of first electrodes and the second electrode; and
forming a second polarizing plate on the plurality of first electrodes.

14. The method of claim 13, further comprising:
forming a gap between the backlight unit and the first polarizing plate,
wherein the gap includes either an air gap or a dielectric gap.

15. The method of claim 14, wherein a distance measurement between the backlight unit and the first polarizing plate within the gap changes based on the touch force applied from the object,
wherein a minimum of the distance measurement is indicative of the saturated state.

16. A driving circuit comprising:
an electrode signal application unit configured to apply a first electrode driving signal to a plurality of first electrodes included in a display panel and apply a second electrode driving signal to a second electrode;
a capacitance sensing unit configured to sense at least one of a first capacitance between a contact object, which comes into contact with the display panel, and the first electrodes and a second capacitance between the first electrodes and the second electrode; and
a touch force sensing unit configured to compare the second capacitance with a reference value and a reference saturation value that is greater than the reference value, and in response to the second capacitance being smaller than the reference value, the driving circuit senses a change in the second capacitance and a touch force on the display panel is sensed based on the change in the second capacitance, and in response to the second capacitance being larger than or equal to the reference saturation value, the touch force on the display panel is sensed based on a change in the first capacitance, and when the second capacitance is larger than or equal to the reference value and smaller than the reference saturation value, the touch force on the display panel is sensed based on both a change in the first capacitance and the second capacitance.

17. The driving circuit of claim 16, wherein, the second electrode driving signal is a ground voltage.

\* \* \* \* \*